United States Patent
McFarland et al.

(10) Patent No.: US 6,903,760 B2
(45) Date of Patent: Jun. 7, 2005

(54) METHOD AND SYSTEM FOR LABELING A STORAGE MEDIA

(75) Inventors: Thomas C McFarland, Corvallis, OR (US); Pieter J van Zee, Corvallis, OR (US); Kathryn L Mitchell, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 128 days.

(21) Appl. No.: 10/066,379

(22) Filed: Jan. 30, 2002

(65) Prior Publication Data

US 2003/0142199 A1 Jul. 31, 2003

(51) Int. Cl.7 .............................. B41J 2/47; G11B 7/085
(52) U.S. Cl. .................................... 347/225; 369/30.04
(58) Field of Search .......................... 347/224–225, 347/116, 118, 251, 240; 369/30.04, 275.3, 282–284, 13.24, 13.35, 53.44; 428/136, 40.1; 358/109; 382/100

(56) References Cited

U.S. PATENT DOCUMENTS

| | | | | |
|---|---|---|---|---|
| 4,937,119 A | * | 6/1990 | Nikles et al. | 428/64.8 |
| 5,040,003 A | * | 8/1991 | Willis | 347/118 |
| 5,518,325 A | | 5/1996 | Kahle | 400/70 |
| 5,770,289 A | * | 6/1998 | Tracy | 428/40.1 |
| 6,074,031 A | | 6/2000 | Kahle | 347/4 |
| 6,097,503 A | * | 8/2000 | Felleman | 358/109 |
| 6,329,035 B1 | | 12/2001 | Iwasaki et al. | 428/64.1 |
| 6,511,731 B2 | * | 1/2003 | Clark | 428/136 |
| 2002/0145614 A1 | * | 10/2002 | Van Valer | 345/629 |
| 2002/0146147 A1 | * | 10/2002 | Levy | 382/100 |

OTHER PUBLICATIONS

"Personal Technology, Apple iPhoto Is So Good That Digital–Photo Fans May Yearn for a MAc" Article by Walter S. Mossberg from The Wall Street Journal, Marketplace on Thursday, Jan. 24, 2002 p. B1.

* cited by examiner

*Primary Examiner*—Hai Pham
(74) *Attorney, Agent, or Firm*—Jeff D Limon (57) ABSTRACT

A system for labeling a storage media is disclosed. The system includes a unit for arranging images, wherein the images correspond to images encoded on the storage media. The system also includes a device for printing the images coupled to the unit for arranging the images. Printing may be performed by one of a printer and a laser.

17 Claims, 6 Drawing Sheets

METHOD AND SYSTEM FOR LABELING A STORAGE MEDIA

BACKGROUND OF THE INVENTION

The invention pertains generally to labeling and, more particularly, to labeling storage media.

As computer users store more and more diverse types of data onto removable storage media such as rewriteable optical discs as well as other optical, magnetic, and solid-state storage media, these users typically use labels to conveniently identify particular pieces of storage media. For example, when a user stores photographs on an optical storage disc (such as a compact disc, for example) the user may purchase a label having a pair of precut concentric circular grooves that correspond to the inner and outer boundaries of the optical storage disc. The label typically includes an adhesive that separates from a backing material that allows the label to be affixed to the optical storage disc.

Often, the user prints a label using a printer and affixes the label to a side of the optical storage disc. In order to position the information within the boundaries of the precut grooves, the user may interact with a computer that runs software that generates the label. In addition to interacting with the computer, the user must also meticulously adjust the position of the precut label within the printer so that the information is printed within the boundaries defined by one or more of the precut concentric circular grooves. This often requires the user to iteratively print a label, make adjustments to either the software or the printer settings, or both, and then print another label until the label information is properly aligned within the label's bounds. Further, in the event that the user changes to a different printer, the alignment process must be repeated in order to account for the variations among different printers.

Thus, in addition to requiring substantial time to produce a storage media label, the labeling process is further confounded by the relative expense of the precut label compared to the cost of the optical storage disc. A blank precut label can cost several times the amount paid for a blank optical storage disc, dramatically increasing the cost of the labeled optical storage disc. This cost can be increased even further by the need to iteratively print several labels until a single, carefully aligned label can be printed and affixed to the optical storage disc.

DESCRIPTION OF THE PREFERRED EMBODIMENTS

Figure 1:
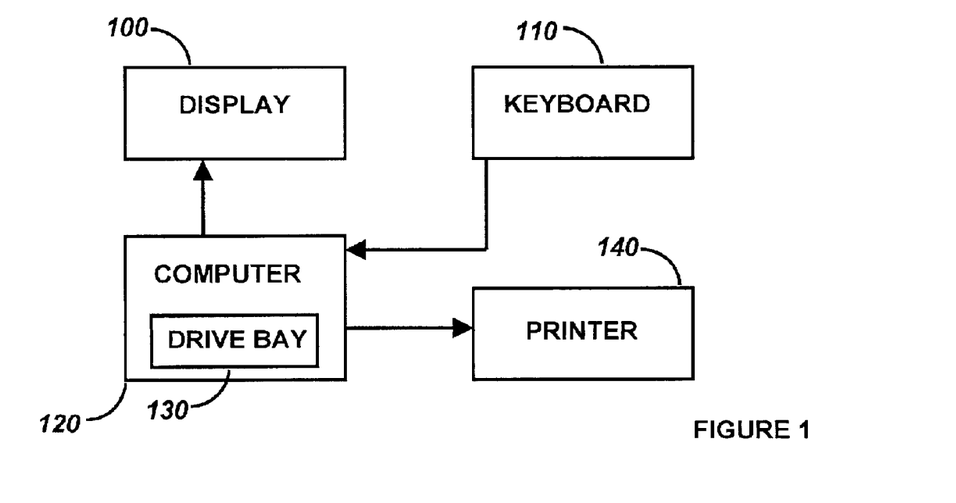
FIG. 1 is a block diagram of a system for labeling a storage media in accordance with a preferred embodiment of the invention.

FIG. 1 is a block diagram of a system for labeling a storage media in accordance with a preferred embodiment of the invention. In FIG. 1, computer 120 represents any one of various types of portable laptop, handheld, or desktop computers, and computing devices. Computer 120 can also represent any other type of consumer electronics device that includes a general purpose or specialized computing capability. Drive bay 130, which operates under the control of computer 120 can be any one of several types of computer drives, such as those used to store information on optical, magnetic, solid-state, or other media types. In the example of FIG. 1, drive bay 130 is an optical storage disc drive capable of writing data to a recordable compact disc, or a digital versatile disc. Drive bay 130 desirably encodes information on the storage media, such as still or moving pictures downloaded from a user's digital camera, digitized audio recordings, graphical presentations, and so forth.

Printer 140, coupled to computer 120, can be any type of printer operating under the control of computer 120. Thus, printer 140 can represent an inkjet, LaserJet, or employ any other technology that enables images to be printed either on a label or on a side of an optical storage disc. Further, printer 140 need not be directly coupled to computer 120, but may be controlled by computer 120 through an intervening computer network, such as a wireless or wireline local area network, a wide area network, or the Internet.

Display 100, also coupled to computer 120, can be any display type such as a cathode ray tube, flat panel, liquid crystal, or make use of other suitable display technology. Keyboard 110, also coupled to computer 120, represents a means of inputting data into computer 120 under the control of a user. Although not shown, a graphical pointing device, such as a mouse, touchpad, or trackpad may be coupled to computer 120 in order to control the placement of a cursor or other indicator on display 100.

In an alternate embodiment of the invention, the functions of printer 140 can be performed in drive bay 130 by way of a printhead or other printing apparatus operating within the drive bay. In this embodiment, images are impressed directly on an appropriate side of an optical storage disc or other storage media loaded into drive bay 130. Desirably, an ink, or other colored fluid, that dries quickly is used so that the ink or other fluid does not smear or smudge after being impressed on the surface of the optical storage disc. The optical storage disc may also include a porous surface that enhances the absorption of fluid deposited on the surface or enhances the retention of the ink by the surface.

Figure 2:
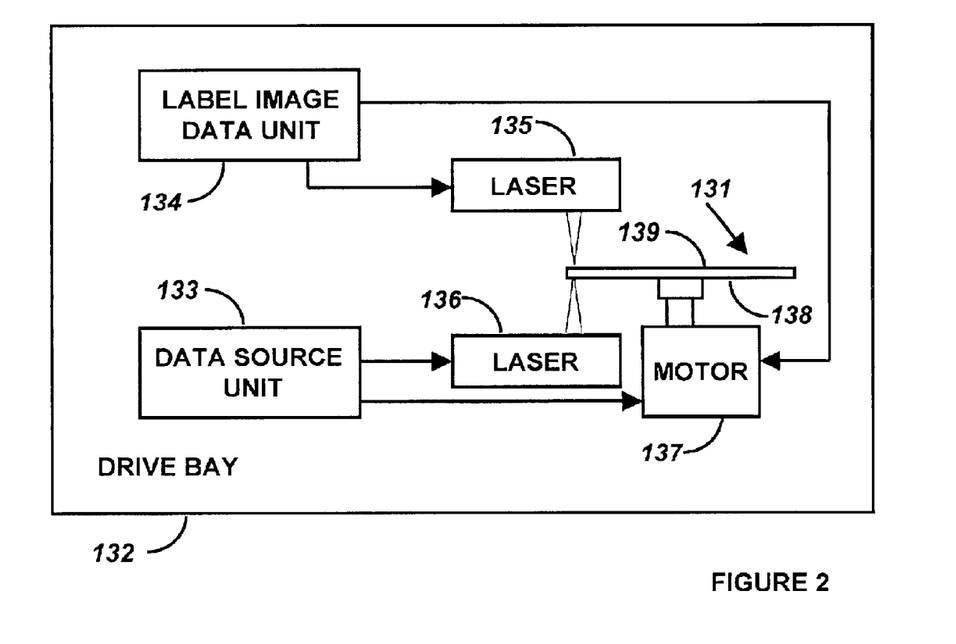
FIG. 2 is a block diagram of an alternate embodiment of a drive bay used in a system for labeling a storage media.

FIG. 2 is a block diagram of an alternate embodiment of a drive bay used in a system for labeling a storage media. In FIG. 2, drive bay 132 includes label image data unit 134, which controls laser 135. In this embodiment, optical storage media 131 includes a layer that thermochromically responds to heat imparted on media 131 by laser 135. By way of this thermochromic response, laser 135 can print either monochromatic or color images directly onto first side 139 of optical storage media 131 depending on the thermochromic color response capability of first side 139. Alternatively, first side 139 of optical storage media 131 includes microencapsulated ink or other colored fluid droplets that respond to the heat generated by laser 135. The heat generated by laser 135 causes microencapsulated ink (or other colored fluid) droplets to burst, thereby distributing the ink or other colored fluid on first side 139, thereby printing images on first side 139.

In the embodiment of FIG. 2, label image data unit 134 stores images that correspond to images encoded on optical storage media 131 and prints these images, by way of modulating laser 135, onto the appropriate side of optical storage media 131. The images can be printed on first side 139 before, during, or after, data source unit 133 encodes data for storage onto optical storage media 131 by way of laser 136, which encodes the data onto second side 138. Other information, such as titles, backgrounds, and artwork (as described in reference to FIGS. 4, 5, and 6) can also be printed on first side. In this embodiment, label image data unit 134 and data source unit 133 cooperate to control motor 137 so that optical storage media 131 can be rotated as required during the processes of printing images onto first side 139 and encoding data onto second side 138.

In another embodiment of the invention, a single laser unit performs the functions of laser 135 and laser 136. In this embodiment, optical storage media 131 can be turned over so that images can be printed on first side 139 after the laser has encoded data onto second side 138. Alternatively, the laser can be moved during the processes of printing images onto first side 139 and encoding data onto second side 138 so that one laser can access both sides of the media.

Figure 3:
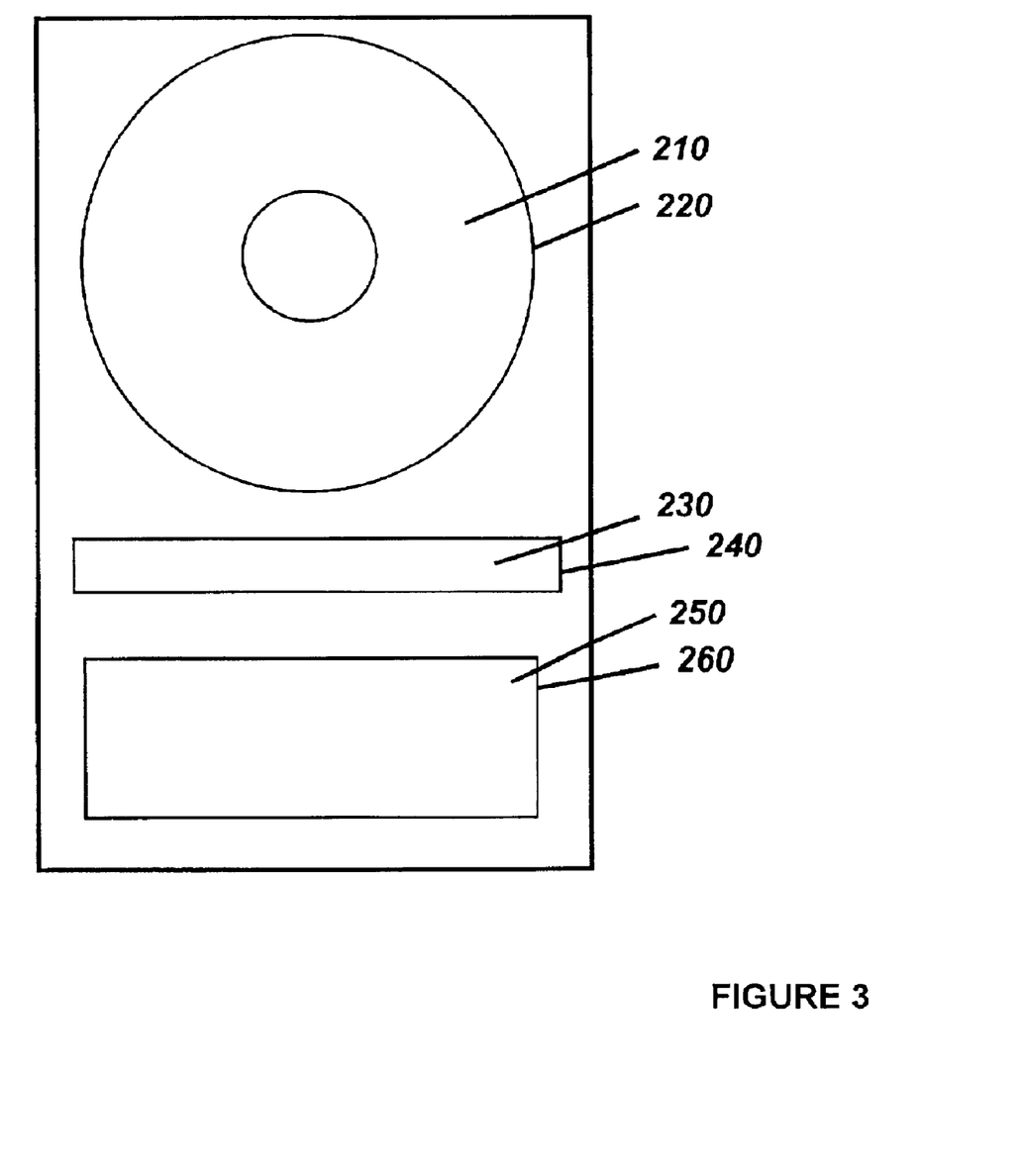
FIG. 3 represents a label page for use in a preferred embodiment of the invention.

FIG. 3 represents a label page for use in a preferred embodiment of the invention. Groove 220, represented by a dark circle, is cut into the label page represented by FIG. 3 and traces a shape that accords with the shape of an optical storage disc. Groove 220 provides a convenient means of separating optical storage disc label 210 from the surrounding portions of the label page represented by FIG. 3. Groove 240, represented by a dark rectangle, is also cut into the label page represented by FIG. 3 and traces a shape that accords with a label that can be affixed to the spine of a jewel case of an optical storage disc. Groove 240 provides a convenient means of separating spine label 230 from the surrounding portions of the label page. Further, groove 260, represented by a second dark rectangle, is cut into the label page of FIG. 3 and traces a shape that accords with the shape of a label that can be affixed to the front of an optical storage disc jewel case. Groove 260 provides a convenient means of separating case label 250 from the surrounding portions of the label page.

Preferably, the reverse sides of optical storage disc label 210, spine label 230, and case label 250 include an adhesive that adheres the labels to a neutral backing material. Prior to affixing the label onto the optical storage disc or onto an appropriate portion of an optical storage disc case, the user separates optical storage disc label 210, spine label 230, and case label 250 from the backing material. Additionally, optical storage disc label 210, spine label 230, and case label 250 are capable of accepting ink or other colored fluid without substantial smudging or smearing. Further, optical storage disc label 210, spine label 230, and case label 250 are sufficiently durable to retain the ink or other fluid for an extended period of time.

In an alternate embodiment, the label page represented by FIG. 3 includes more than one of optical storage disc label 210, spine label 230, and case label 250. The presence of more than one of labels 210, 230, and 250 on a single page enables a standard-sized label page (e.g. 8.5 in×11.0 in.) to be used to prepare and generate labels for use with multiple storage media (such as 12-centimeter optical storage disc) that include similar or even identical content.

Figure 4:
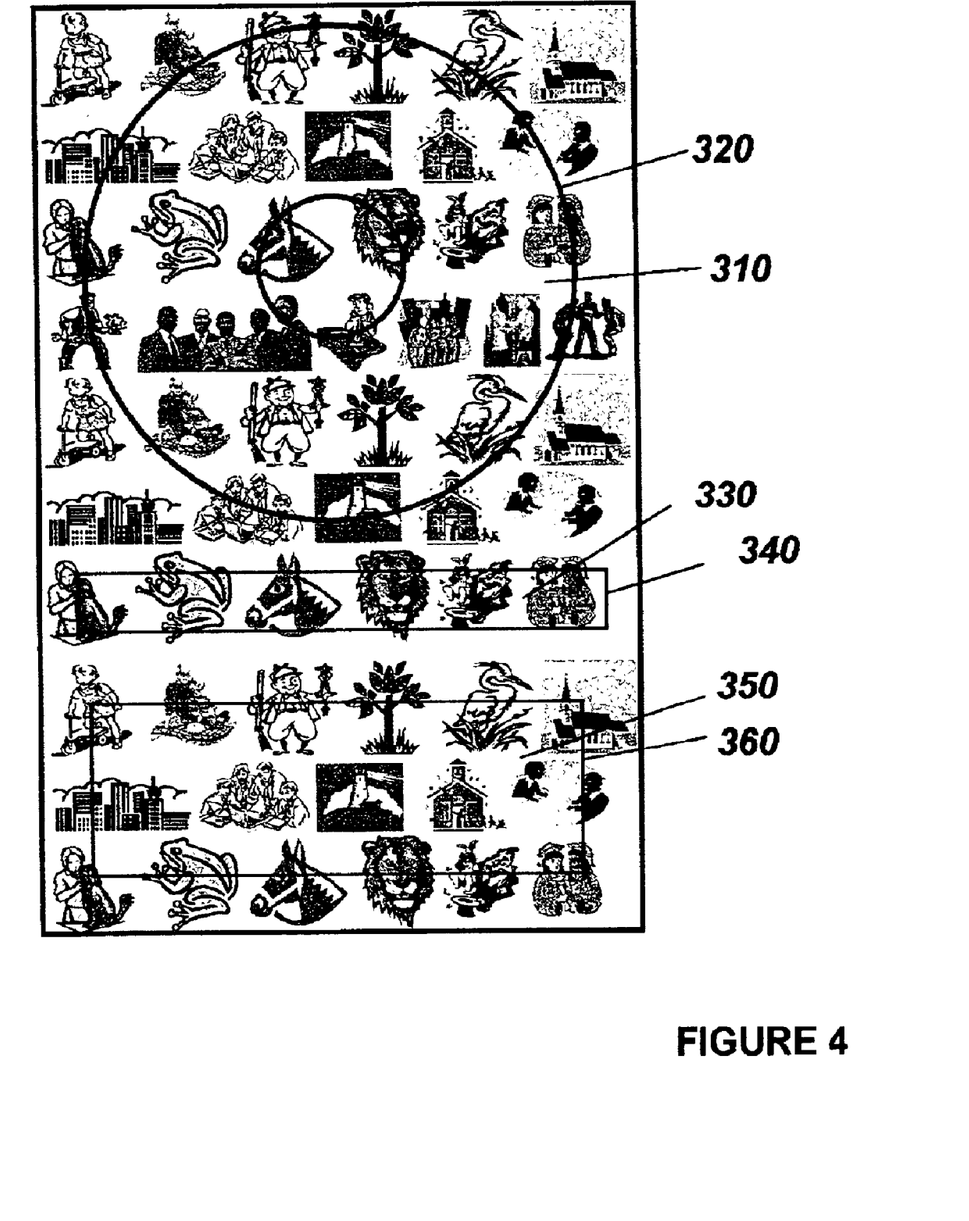
FIG. 4 is a layout of the label page represented by FIG. 3 wherein the label page has been printed with images in accordance with a preferred embodiment of the invention.

FIG. 4 is a layout of the label page represented by FIG. 3 wherein the label page has been printed with images in accordance with a preferred embodiment of the invention. Corresponding to grooves 220, 240, and 260 of FIG. 3, grooves 320, 340, and 360 (of FIG. 4) are represented by dark lines on the layout of FIG. 4. The images printed on the label of FIG. 4 correspond to images or other information stored on an associated storage media. These images are desirably printed within an area that is substantially larger than the area required to cover at least one side of the storage media. Thus, the user of computer 120, or printer 140, need not be concerned with the locations of grooves 320, 340, and 360 on the layout of FIG. 4 when printing the label.

Preferably, the images printed on the label page represented by FIG. 4 are small enough so that at least some of these images fit completely or at least substantially within the areas bounded by grooves 320, 340, and 360. The use of relatively small images printed on the label page represented by FIG. 4 allows case label 350, spine label 330, and optical storage disc label 310 to display images that indicate the content stored on the associated storage media. The identification of content can be enhanced by placing title blocks, backgrounds, and images not stored on the associated media but that may be symbolic of particular content stored on the optical storage disc. These are described in more detail in the description of FIGS. 5 and 6 herein.

Figure 5:
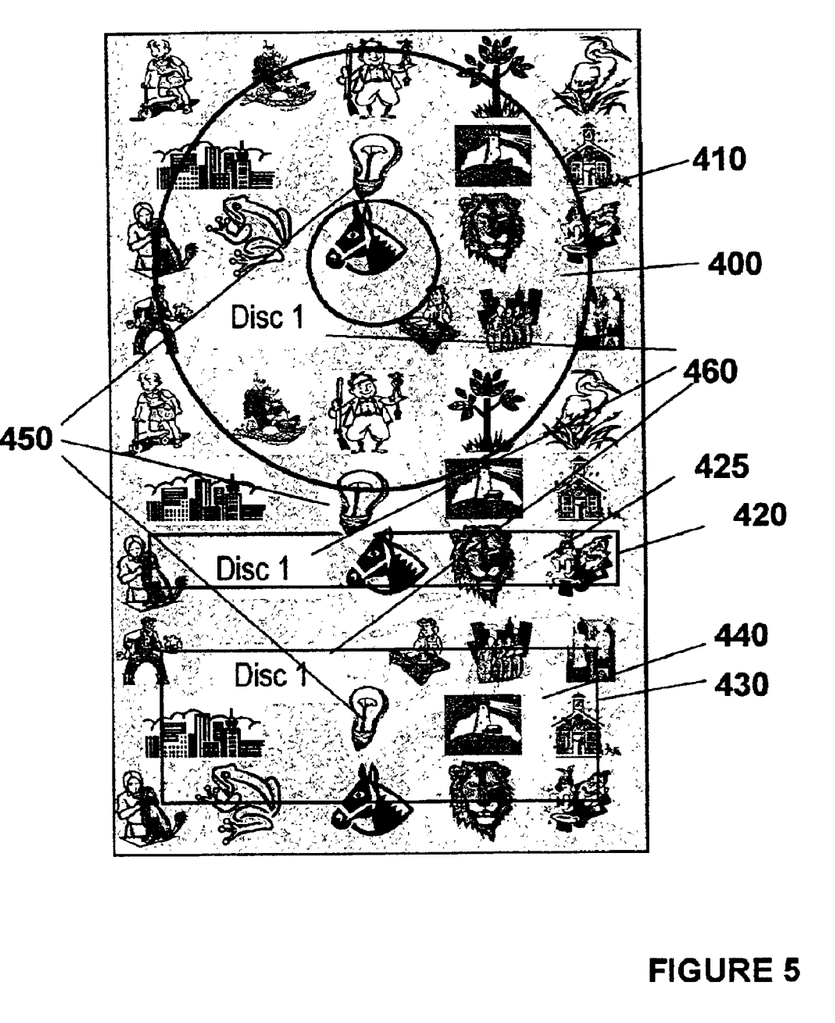
FIG. 5 is a layout that represents a precut label page wherein images and a title of the storage media are printed on the precut label page in accordance with a preferred embodiment of the invention.

FIG. 5 is a layout that represents a precut label page wherein images and a title of the storage media are printed on a precut label page in accordance with a preferred embodiment of the invention. In FIG. 5, groove 410, represented by a single dark line, has been cut to separate optical storage disc label 400 from other portions of the label page represented by FIG. 5. Additionally, groove 420, represented by a single dark line, is precut to separate spine label 425 from other portions of the label page. Further, groove 430, represented by a single dark line, separates case label 440 from other portions of the label page.

As mentioned in reference to FIG. 4, in addition to including images that have been encoded on an associated optical storage disc, the images printed on the label page represented by FIG. 5 may also include images that are not stored on the optical storage disc. Thus, if the associated optical storage disc includes pictures from a particular event, artwork associated with the particular event can be disposed among the images. In the example of FIG. 5, artwork showing in the form of light bulb 450 has been included near the center of the Figure. In another example (not shown), if the associated optical storage disc includes pictures of a patriotic celebration, artwork of patriotic symbols, such as flags and other symbols, can be disposed among the images.

In the event that other content has been encoded onto the storage media, such as a music selection, artwork associated with the encoded music selection can be printed on label page 405. This artwork can include imagery that represents the musician(s) performing the music selection, or may be imagery associated with the original release of the source media from the music company.

Portions of the background added to the label page represented by FIG. 5 can be seen between adjacent ones of the images presented on the label page. In the example of FIG. 5, a background of snowflakes has been added. To adjust the visibility of the background, the distances between adjacent images can be increased or decreased in order to modify the amount of background in view compared to the images shown. The background can be selectable by the user and may correspond to an image encoded on the optical storage disc associated with the label page, or may be artwork that is not encoded on the storage media, as selected by the user.

FIG. 5 also includes titles 460, which are disposed on the label page. This distribution of titles 460 on optical storage disc label 400 can be performed by a computer program that automatically, and without user input, distributes the titles across the label of FIG. 5. The distribution can be performed such that optical storage disc label 400 can be substantially any size and while still including at least a discernable portion of one of more of titles 460.

The distribution of titles 460 can also be based on an input that conveys the size of the target storage media. If the computer program performs the distribution automatically, the distribution can be based on an algorithm that results in a label design in which a title, or at least a substantial portion of a title, is virtually always visible on optical storage disc label 400 regardless of where label 400 is located on the label page. Thus, for a standard 12-centimeter optical storage disc, titles 460 are arranged in a pattern having one title near the middle portion of the top of the page, and two additional sets of titles at the lower portion of label page of FIG. 5. This arrangement of titles 460 results in a user-selected title, or at least a substantial portion of one of titles 460, being visible on the optical storage disc label 400, spine label 425, and case label 440. If the selected storage media is an 8-centimeter optical storage disc, such as that of FIG. 6, the placement of titles 460 can be adjusted, either automatically or by the user, so that an entire title block appears within one or more of case label 440, spine label 425, and optical storage disc label 400.

In the example of FIG. 5, title 460 (DISC 1) corresponds to a title encoded on the optical storage disc associated with the label of FIG. 5. However, nothing prevents the use of a different title, or a title that includes only a subset of the information contained in the title encoded on the associated optical storage disc.

Figure 6:
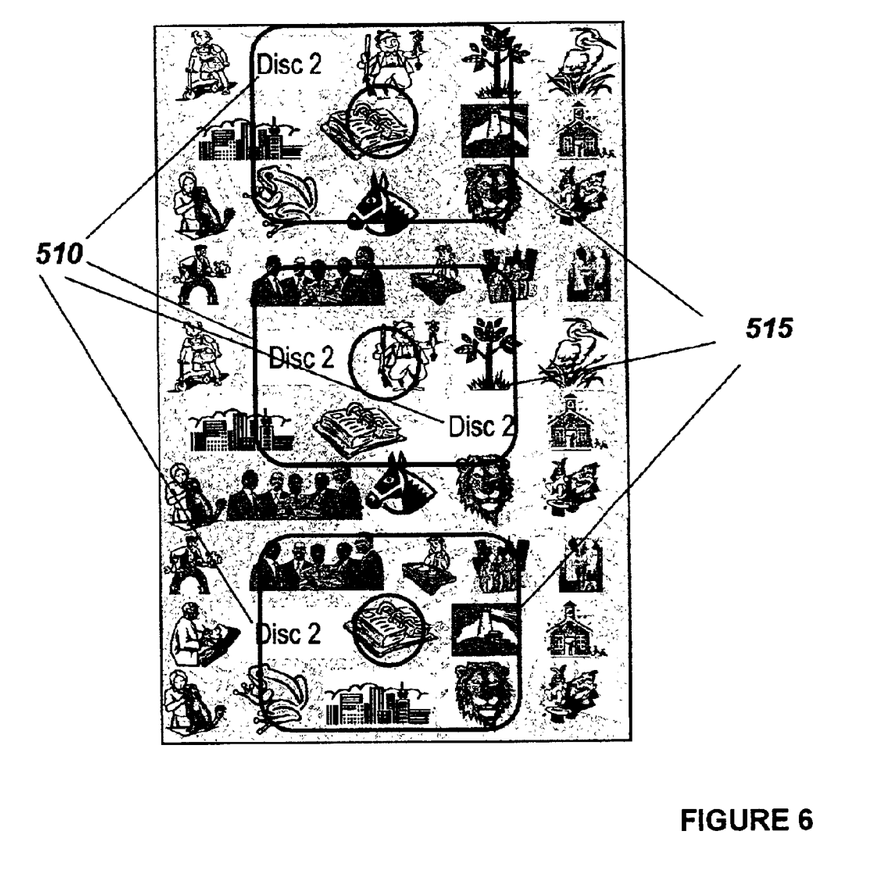
FIG. 6 is a layout that represents a second precut label page wherein images and a title of the storage media are printed on the precut label page in accordance with a preferred embodiment of the invention.

FIG. 6 is a layout that represents a second precut label page wherein images and a title of the storage media are printed on the precut label page in accordance with a preferred embodiment of the invention. The layout of FIG. 6 is suitable for affixing to an associated 8-centimeter optical storage disc, significantly smaller than the previously mentioned 12-centimeter disc. As can be seen, a greater number of titles 510 are present in FIG. 6 than are present in FIG. 5, thus increasing the likelihood that one of titles 510, or at least a substantial portion of one of titles 510, will appear within the bounds of one of grooves 515. Further, the user may choose to print to only a selected area of the label page of FIG. 6, such as the upper third, in order to produce a single label for a single 8-centimeter optical storage disc.

The layouts of FIGS. 5 and 6 can each be generated automatically and without user input and presented to the user before, during, or after images are encoded and stored on the optical storage disc. This allows the user to select a label page layout that is suitable for a given optical storage disc size. Additionally, a layout can be generated without user input that is suitable for multiple sizes of optical storage discs, thus not requiring the user to select a layout that is related to the size of the optical storage disc.

Alternatively, either one of the layouts of FIG. 5 and 6 can be generated in response to an input from a user which conveys the size of the storage media. The selected layout can be arranged and saved to a composite file, such as a portable document formatted file for later printing by the user.

In the event that images corresponding to the content stored on a given optical storage disc are to be printed directly onto an appropriate side of the optical storage disc, such as by way of the system of FIG. 2, a layout that represents the area that encompasses the boundaries of the optical storage disc can be presented to the user. In a manner that accords with the user's selection of a label page layout suitable for a given optical storage disc size, the user may select a layout to be printed directly on the side of the optical storage disc by way of a laser. Additionally, either one of the layouts of FIG. 5 and 6 can be generated in response to an input from a user that conveys the size of the storage media on which the images are to be printed. Further, the selected layout can be arranged and saved to a composite file, such as a portable document formatted file for later printing on a side of the optical storage disc.

A wide variety of layouts other than those shown in FIGS. 5 and 6 as well as wide variety of media other than an optical storage media are contemplated. In an example that is not shown in the Figures, a layout suitable for use with a substantially flat, rectangular, solid-state storage media can be generated. The layout can include precut grooves that permit the label to be affixed to one or both sides of the solid-state storage media.

The layouts of FIGS. 4, 5, and 6 can be generated by way of a computer program written in one of several high level programming languages, such as C++, Java, and so forth. The computer program desirably operates by placing scaled versions (e.g. thumbnails) of images corresponding to images encoded on the associated storage media into a composite file. In addition to these images, title fields having maximum string length and font size are disposed within the composite file. Artwork and background not stored on the associated storage media are scaled and placed within the composite file as well. An algorithm may be used to scale the size of each image, title, and selection of artwork according the size of the storage media and the size of the label page or the size of the storage media. Conventional graphical user interface techniques may be used to receive input from the user, present the composite file to the user, and store the composite file into memory.

The composite file can be formatted according to a portable document format, such as a .pdf file, that is portable among many types of computers. Preferably, the composite file is also "printer neutral", meaning that the chosen format can be printed on various types of printers that employ various types of printing technologies. The preparation of the composite file allows the files to be stored indefinitely in a memory accessible by the computer.

Figure 7:
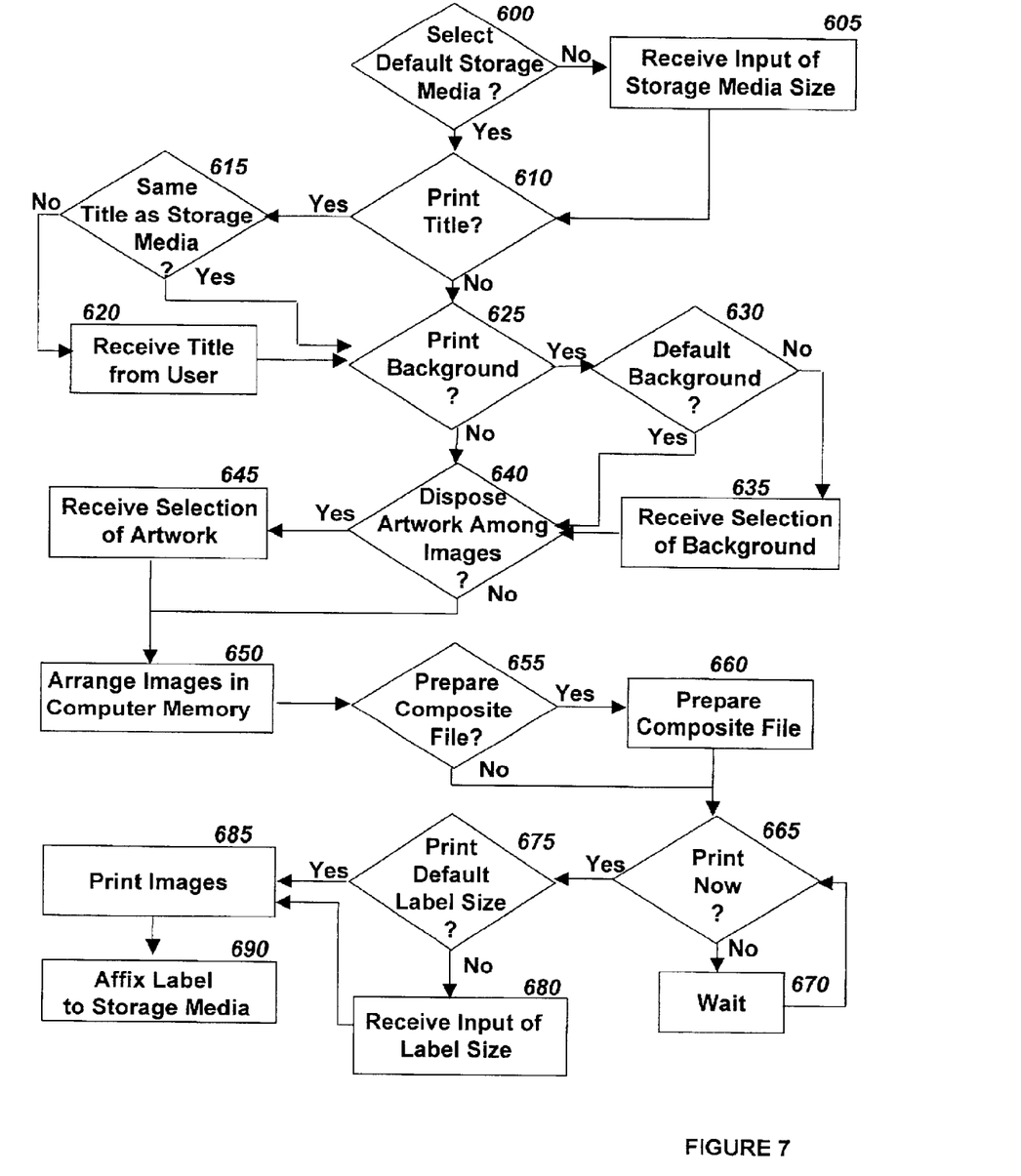
FIG. 7 is a flowchart for a method of labeling a storage media in accordance with a preferred embodiment of the invention.

FIG. 7 is a flowchart for a method of labeling a storage media in accordance with a preferred embodiment of the invention. The method of FIG. 7 begins at block 600 in which a decision is made as to whether a default storage media is to be used. The use of a default storage media alleviates the need for a user to repeatedly input a storage media type when multiple storage media of a single type such as a standard, 12-centimeter optical storage disc is normally used. In the event that the default storage media is not being used, block 605 can be executed in which an input of a new storage media size is received.

The method continues at block 610 in which a decision is made as to whether a title should be printed. In the event that a title should be printed, block 615 is executed in which a decision is made as to whether the title is to correspond to a title encoded on the associated storage media. If the user wishes to print the title encoded on the associated disc, the method continues at block 625. In the event that the user wishes to include a title that does not correspond to a title encoded on the storage media, block 620 is executed in which a different title is received from the user.

The method continues at block 625 in which a decision is made as to whether a background should be included on the label. In the event that a background should be included, block 630 is executed in which a decision is made as to whether a default or previously stored background should be used. In the event that the user wishes to use the default or previously stored background, the method continues at block 640. In the event that the user wishes to change the background, block 635 is executed in which the user inputs a selected background. This input can include the selection of a background that has been previously used in labeling a storage media or can include the creation of a new background.

At block 640, a decision is made as to whether artwork, or other images not encoded on the associated storage media, should be disposed among the images that correspond to the images encoded on the storage media. If the user desires to include artwork among the images, block 645 is executed in which an input, which indicates the artwork to be disposed among the images, is received and the method continues at block 650. If the user does not wish to dispose artwork among the images, the method proceeds block 650 without receiving the input.

At block 650, images that correspond to images encoded on a storage media are arranged in a memory of a computer. Block 650 may include disposing a title as well as artwork and a background among the images in memory. The method continues at block 655 in which a decision is made as to whether a composite file that includes the arranged images should be prepared.

In the event that the user wishes to prepare a composite file that includes the arranged images, block 660 is executed in which the composite file is prepared. Block 660 may include disposing artwork as well as a background and a title among the arranged images within the composite file. The method continues at block 665 in which a decision is made as to whether the label should be printed now, or whether the label is to be printed at a later time. In the event that the user does not to wish to print the label now, block 670 is executed in which the computer waits until the user desires to print the label. Thus, the waiting of block 670 can represent an indefinite period of time in which the composite file is stored in the computer until such time as the user interacts with the computer to print the arranged images, as well as a previously selected title, artwork, and background stored as a composite file.

In the event that the decision of block 665 indicates that the user wishes to print the label at the present time, block 675 is executed in which a decision is made as to whether a default label size should be used. This allows the user to print over an entire label page, which may include more than one set of precut grooves that define the boundaries of the case label, spine label, and storage media label, or whether the print area should be confined to a smaller area of the label page. The default label size of block 675 can be set to correspond to printing an entire label page, or an area that includes only a portion of the label page. In the event that the user wishes to print on an area of the label page that is different than the default area, block 680 is performed in which an input of the label page size is received.

In the event that the decision of block 675 indicates that the default label size is to be used, or after receiving an input of the label size to be used, block 685 is executed in which the images are printed onto a label. Block 685 may include one or more of: printing a title, printing artwork, and printing a background on the label as well. The method continues at block 690 in which the user affixes the label to a storage media. In the event that the label page is adhered by way of an adhesive to a backing, block 690 may include separating the label from a backing material prior to a fixing the label to the storage media.

In another embodiment of the invention, blocks 685 and 690 need not be performed. In this embodiment, the method terminates at block 660 in which a composite file is prepared. The printing and affixing blocks, 685 and 690, respectively, can then be performed at a later time.

Portions of the method of FIG. 7 can be encoded onto one or more computer-readable media having computer-readable instructions thereon, which, when executed by a computer, cause the computer to generate a file used to print a label for a storage media. For example, blocks 600 through 680 can be encoded onto the previously mentioned computer-readable media. In the event that a portion of the method of FIG. 7 is implemented using a computer readable media, the method should at least include block 650, in which images that correspond to images encoded on a storage media are arranged in a memory of a computer. The method should also include block 660, in which the composite file that includes the images is prepared. One of blocks 675 and 680 should include transmitting the composite file to a printer.

As mentioned in reference to FIG. 1, an alternate embodiment can include printing images directly on the optical storage disc or other storage media. For this embodiment, the method of FIG. 7 can be adapted to perform the direct printing. The adapted method would not include blocks 675-680, in which the default label page size is selected (block 675) or a new label pages size is selected (block 680). In this alternate embodiment, these blocks need not be performed since the label size should, at least approximately, coincide with the size of the storage media, selected in block 600. Further, block 690 need not be executed.

As mentioned in reference to FIG. 2, another embodiment of the invention includes the use of a label image data unit coupled to a laser wherein the laser prints images on an appropriate side of an optical storage unit. The method FIG. 7 can also be adapted to perform the aforementioned laser printing. In this adapted method, blocks 675–680 are not executed, in which the default label page size is selected (block 675) and a new label pages size is selected (block 680). In this alternate embodiment, these blocks need not be performed since the label size should, at least approximately, coincide with the size of the storage media, selected in block 600. Further, block 690 need not be executed.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method of labeling a storage media, comprising:

receiving an indication from a user that indicates the size of a label page that includes said label;

arranging images in a memory of a computer, said arranged images corresponding to images encoded on said storage media;

printing said arranged images onto said label page; and affixing said label onto said storage media.

2. The method of claim 1, additionally comprising printing a title onto said label page prior to said affixing.

3. The method of claim 2, wherein said title corresponds to a title encoded on said storage media.

4. The method of claim 2, further comprising said computer receiving said title from said user.

5. The method of claim 1, wherein said arranging further comprises preparing a composite file that includes said arranged images.

6. The method of claim 5, wherein said composite file is formatted in accordance with a portable document format.

7. The method of claim 1, further comprising receiving an input from said user, said input indicating a background, wherein portions of said background are printed between adjacent ones of said arranged images.

8. The method of claim 1, further comprising printing a background, wherein portions of said background are printed between adjacent ones of said arranged images.

9. The method of claim 1, further comprising receiving an input from said user, said input indicating artwork to be printed among said arranged images printed on said label page.

10. The method of claim 1, further comprising printing artwork among said images printed on said label page.

11. One or more computer-readable media having computer-readable instructions thereon, which, when executed by a computer, cause the computer to generate a file used to label a storage media, said method comprising:

receiving an indication from a user that indicates the size of said labeling media;

arranging images in a memory of said computer, said images corresponding to images encoded on said storage media;

disposing a title within said arranged images based on said input of said storage media size;

preparing a composite file of said arranged images; and transmitting said composite file to one of a print head and a laser.

12. The computer-readable media of claim 11, wherein said preparing further comprises preparing a portable document formatted file.

13. The computer-readable media of claim 11, wherein said method further comprises receiving an input that indicates the size of said storage media.

14. The computer-readable media of claim 11, wherein said method further comprises receiving an input that indicates a selection of a background, wherein portions of said background are printed between adjacent ones of said arranged images.

15. A method of preparing a label for a storage media, comprising:

receiving an indication from a user that indicates the size of said labeling media;

arranging images in a memory of a computer, said images corresponding to images encoded on said storage media; and preparing a composite file that includes said arranged images to be printed on said label of said storage media, said composite file being adapted for storage by said computer.

16. The method of claim 15, wherein said composite file is a portable document formatted file.

17. The method of claim 15, further comprising receiving an indication from a user that indicates the size of said storage media.

* * * * *